(12) United States Patent
Parietti (10) Patent No.: US 11,763,330 B1
(45) Date of Patent: Sep. 19, 2023

(54) SYSTEM AND METHOD OF RECOMMENDING A PAYMENT OPTION

(71) Applicant: Charles Parietti, Raleigh, NC (US)

(72) Inventor: Charles Parietti, Raleigh, NC (US)

(*) Notice: Subject to any disclaimer, the term of this patent is extended or adjusted under 35 U.S.C. 154(b) by 0 days.

(21) Appl. No.: 17/864,085

(22) Filed: Jul. 13, 2022

(51) Int. Cl.
  *G06Q 30/0211* (2023.01)
  *G06Q 30/0601* (2023.01)
  *G06Q 20/36* (2012.01)

(52) U.S. Cl.
  CPC ........ *G06Q 30/0211* (2013.01); *G06Q 20/36* (2013.01); *G06Q 30/0633* (2013.01)

(58) Field of Classification Search
  CPC ..... G06Q 30/0207–0277; G06Q 20/36; G06Q 30/0633
  USPC ....................................... 705/14, 319, 14.13
  See application file for complete search history.

(56) References Cited

U.S. PATENT DOCUMENTS

| | | | |
|---|---|---|---|
| 8,438,077 B2 | 5/2013 | Walker et al. | |
| 8,768,831 B2 | 7/2014 | Mohsenzadeh | |
| 10,089,646 B1 | 10/2018 | Mohsenzadeh | |
| 10,445,715 B2 | 10/2019 | Granbery et al. | |
| 2002/0062249 A1* | 5/2002 | Iannacci | G06Q 30/06 705/14.1 |
| 2014/0136353 A1* | 5/2014 | Goldman | G06Q 20/227 705/16 |
| 2018/0260833 A1* | 9/2018 | Khan | G06Q 20/3224 |
| 2018/0276710 A1 | 9/2018 | Tietzen et al. | |
| 2019/0139019 A1* | 5/2019 | Bloys | G06Q 20/3223 |
| 2022/0172256 A1* | 6/2022 | D'Alessandro | G06Q 30/0279 |
| 2022/0270168 A1* | 8/2022 | Daya | G06Q 20/4037 |

FOREIGN PATENT DOCUMENTS

WO WO-2012047911 A2 * 4/2012 ....... G06F 17/30864

OTHER PUBLICATIONS

Dynamic Discounting, What Are Early Payment Discounts? Here's the Complete Guide, 2022 (Year: 2022).*

* cited by examiner

*Primary Examiner* — Tarek Elchanti
(74) *Attorney, Agent, or Firm* — SHORE IP GROUP, PLLC; Sean R. Wilsusen, Esq.

(57) ABSTRACT

A computer-implemented method of recommending a payment option includes receiving data of payment options for a user. Data of a prospective purchase to be made by the user is received. At least two of the payment options are available for making the prospective purchase. A classifier determines an available incentive associated with each of the at least two payment options. The classifier applies a value to each of the incentives. The classifier compares the values for each of the incentives. A payment option having the highest corresponding incentive value is identified. The payment option having the highest corresponding incentive value is recommended to the user.

18 Claims, 8 Drawing Sheets

SYSTEM AND METHOD OF RECOMMENDING A PAYMENT OPTION

FIELD

The present disclosure relates to payment options and, more particularly, to a system and method of recommending a payment option.

BACKGROUND

A payment system refers to a system used to settle financial transactions through the transfer of monetary value. Payment systems can include the institutions, instruments, people, rules, procedures, standards, and technologies that make an exchange possible. As an example, an operational network links bank accounts and provides for monetary exchange using bank deposits. Some payment systems also include credit mechanisms.

Payment systems are used in lieu of transferring cash in domestic and international transactions. Traditional payment systems may include negotiable instruments such as drafts (e.g., checks) and documentary credits such as letters of credit. With the widely adopted use of computers and electronic communications, many alternative electronic payment systems have emerged. The phrase electronic payment refers to a payment made from one source (e.g., a bank account) to another using electronic methods and forgoing the direct intervention of bank employees.

Electronic payments often include incentives, such as travel points or cash back incentives. However, when multiple electronic payment options are available for making a purchase, it can be difficult to compare one form of electronic payment with another to maximize capturing such incentives.

SUMMARY

Provided in accordance with aspects of the present disclosure is a computer-implemented method of recommending a payment option. The method includes receiving data of payment options for a user. Data of a prospective purchase to be made by the user is received. At least two of the payment options are available for making the prospective purchase. A classifier determines an available incentive associated with each of the at least two payment options. The classifier applies a value to each of the incentives. The classifier compares the values for each of the incentives. A payment option having the highest corresponding incentive value is identified. The payment option having the highest corresponding incentive value is recommended to the user.

In an aspect of the present disclosure, the classifier includes a convolutional neural network (CNN, or ConvNet), a Bayesian network, a neural tree network, or a support-vector machine (SVM).

In an aspect of the present disclosure, the payment options are stored in a digital wallet, an electronic wallet, or a database.

In an aspect of the present disclosure, the incentives include cash back, rewards points, or non-monetary benefits.

In an aspect of the present disclosure, the non-monetary benefits include an additional warranty, theft protection, flight forgiveness, or insurance.

In an aspect of the present disclosure, a list is generated including the value applied to the available incentive associated with each of the at least two payment options. The list is transmitted to the user.

In an aspect of the present disclosure, the payment options include at least one credit card, at least one debit card, at least one prepaid card, at least one gift card, at least one bank card, at least one virtual card, at least one membership card, or at least one membership account.

In an aspect of the present disclosure, the payment option include at least one cryptocurrency.

In an aspect of the present disclosure, the cryptocurrency is authenticated using a blockchain.

In an aspect of the present disclosure, a list of payment options is provided in order of priority based on at least one predetermined priority convention provided by the user.

In an aspect of the present disclosure, a new payment option not included in the payment options for the user is identified. A recommendation to sign up for the new payment option is transmitted to the user.

In an aspect of the present disclosure, at least one value preference is received from the user. The value applied by the classifier is increased based on the value preference received from the user.

In an aspect of the present disclosure, an amount of incentives previously accrued for each payment option is determined. A list is generated including the incentives previously accrued for each payment option. The list is transmitted to the user.

In an aspect of the present disclosure, the data of the prospective purchase to be made by the user is received from a digital shopping cart, location tracking, or provided by the user manually.

In an aspect of the present disclosure, an alternative purchase that might be considered by the user is identified based on the data of the prospective purchase. A payment option for the user is available for making the alternative purchase. The classifier determines an incentive associated with the payment option available for making the alternative purchase. The classifier applies a value to the available incentive. A recommendation for the alternative purchase is transmitted to the user. The recommendation for the alternative purchase includes the value applied to the available incentive for the alternative purchase.

In an aspect of the present disclosure, a new payment option for the alternative purchase is identified. A recommendation is sent to the user to sign up for the new payment option.

BRIEF DESCRIPTION OF THE DRAWINGS

Various aspects and features of the present disclosure are described hereinbelow with reference to the drawings wherein.

DETAILED DESCRIPTION

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The system and method of recommending a payment option described herein may be a cloud-based application that is accessible through a device such as a smartphone, tablet computer, or laptop computer, or through a specialized hardware device.

The system and method of recommending a payment option described herein may also be implemented as web browser plug-in.

Figure 1:
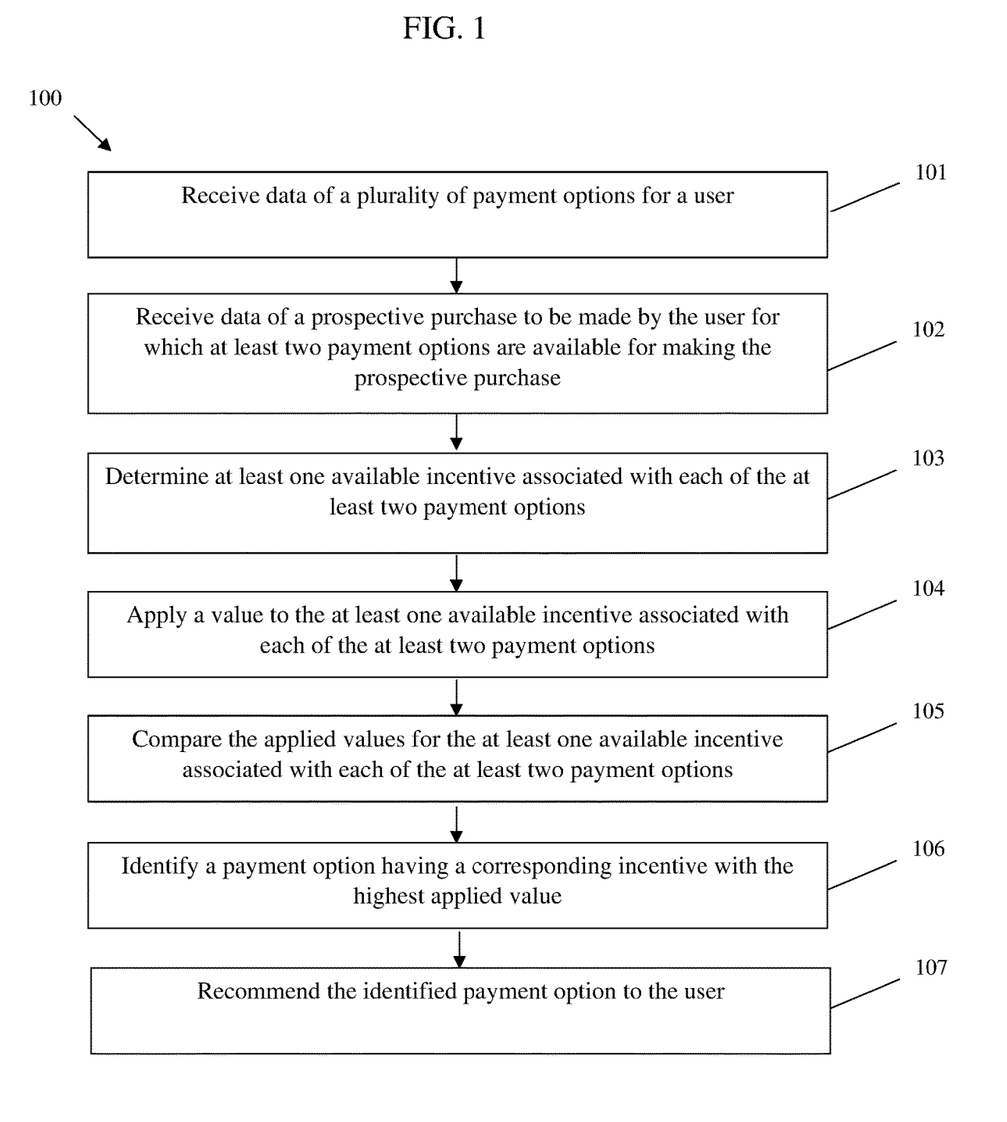
FIG. 1 is a flowchart of a method of recommending a payment option according to aspects of the present disclosure.

Referring particularly to FIG. 1, a computer-implemented method of recommending a payment option includes receiving data of payment options for a user 101. Data of a prospective purchase to be made by the user is received in which at least two of the payment options are available for making the prospective purchase 102. A classifier determines an available incentive associated with each of the at least two payment options 103. The classifier applies a value to each of the incentives 104. The classifier compares the values for each of the incentives 105. A payment option having the highest corresponding incentive value is identified 106 (e.g., by the classifier). The payment option having the highest corresponding incentive value is recommended to the user 107.

The classifier may include a convolutional neural network (CNN, or ConvNet), a Bayesian network, a neural tree network, or a support-vector machine (SVM).

While a CNN may be employed, as described herein, other classifiers or machine learning models may similarly be employed. The machine learning model may be trained on tagged data, such as previously generated payment option recommendations. The trained CNN, trained machine learning model, or other form of decision or classification processes can be used to implement one or more of the methods, functions, processes, algorithms, or operations described herein. A neural network or deep learning model can be characterized in the form of a data structure storing data representing a set of layers containing nodes, and connections between nodes in different layers are formed or created that operate on an input to provide a decision or value as an output (e.g., a score or weight, as described herein).

Machine learning can be employed to enable the analysis of data and assist in making decisions. To benefit from using machine learning, a machine learning algorithm is applied to a set of training data and labels to generate a "model" which represents what the application of the algorithm has "learned" from the training data. Each element (e.g., one or more parameters, variables, characteristics, or "features") of the set of training data is associated with a label or annotation that defines how the element should be classified by the trained model. A machine learning model predicts a defined outcome based on a set of features of an observation. The machine learning model is built by being trained on a dataset which includes features and known outcomes. There are various types of machine learning algorithms, including linear models, support vector machines (SVM), Bayesian networks, neural tree networks, random forest, and/or XGBoost. A machine learning model may include a set of layers of connected neurons that operate to decide (e.g., a classification) regarding a sample of input data. When trained (e.g., the weights connecting neurons have converged and become stable or within an acceptable amount of variation), the model will operate on new input data to generate the correct label, classification, weight, or score as an output. Other suitable machine learning models may be similarly employed.

In an aspect of the present disclosure, the payment options are stored in a digital wallet, an electronic wallet, or a database. The incentives may include cash back, rewards points, or non-monetary benefits. For example, the non-monetary benefits may include an additional warranty, theft protection, flight forgiveness, or insurance.

In an aspect of the present disclosure, the data of the prospective purchase to be made by the user is received from a digital shopping cart. A prospective purchase may be identified based on a known location of the user. A location of the user can be identified using GPS, or using location tracking of a smartphone or other similar electronic device carried by the user.

The payment options include at least one credit card, at least one debit card, at least one prepaid card, at least one gift card, at least one bank card, at least one virtual card, or at least one membership account or membership card (e.g., a consumer credit card associated with a membership with a particular retailer or platform).

In an aspect of the present disclosure, the payment options include at least one cryptocurrency. The cryptocurrency is authenticated using a blockchain.

As an example, a user seeking to purchase a flight may discover that for this particular prospective purchase a first credit card held in the user's digital wallet will provide a 1.5% cash back bonus and additional incentives related to the purchase listed (e.g., Flight Forgiveness, Lost Luggage, Free Lounge visit) compared to a second credit card that offers 1% cash back along with the same additional incentives related to the purchase listed (e.g., Flight Forgiveness, Lost Luggage, Free Lounge visit). In this instance, the first credit card with the higher value incentive (1.5% cash back) would be recommended.

In an aspect of the present disclosure, a list of payment options is provided in order of priority based on at least one predetermined priority convention provided by the user. The list may include an image or identifying marks for the payment option, each of the available incentives identified, and the value applied to each payment option. User preferences may also be included in the list (see, e.g., FIG. 4).

The methods described below with reference to FIGS. 2-7 may be employed in conjunction with the method described above with reference to FIG. 1. Similarly, the methods described below with reference to FIGS. 2-7 may be employed in conjunction with one another and in combination with the method described above with reference to FIG. 1.

Figure 2:
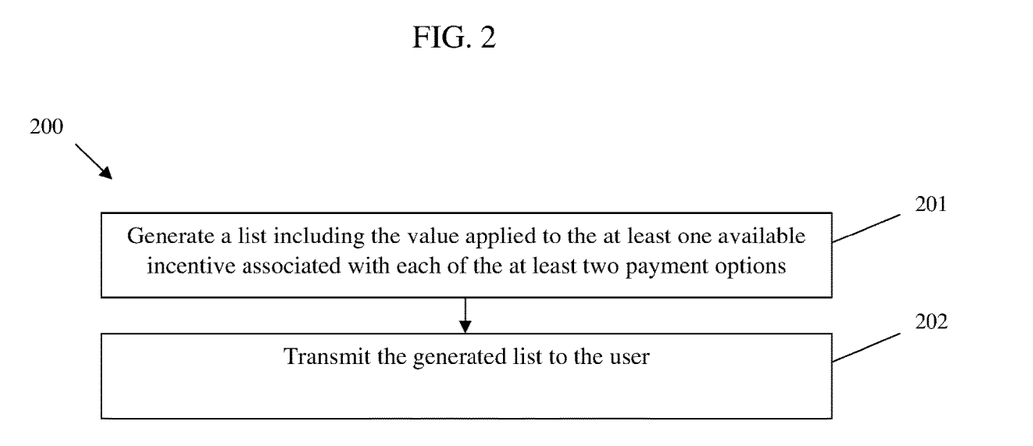
FIG. 2 is a flowchart of another method of recommending a payment option according to aspects of the present disclosure.

Referring particularly to FIG. 2, in method 200 a list is generated including the value applied to the available incentive associated with each of the at least two payment options 201. The list is transmitted to the user 202. As an example, the list may include an image of each payment option, the available incentives for the card, and the values applied to each of the available incentives. For example, a first credit card offering 1.5% cash back may be assigned a lower incentive value than a second credit card offering 1.5% cash back plus a free insurance policy on the purchase.

A relative monetary value may be applied (e.g., by the classifier) to any non-cash back type incentives. For example, a free insurance policy that would generally cost $100 to purchase in cash may be assigned a monetary value proportional the to percent cash back that would need to be captured to receive a $100 incentive using a pure cash back scheme.

Figure 3:
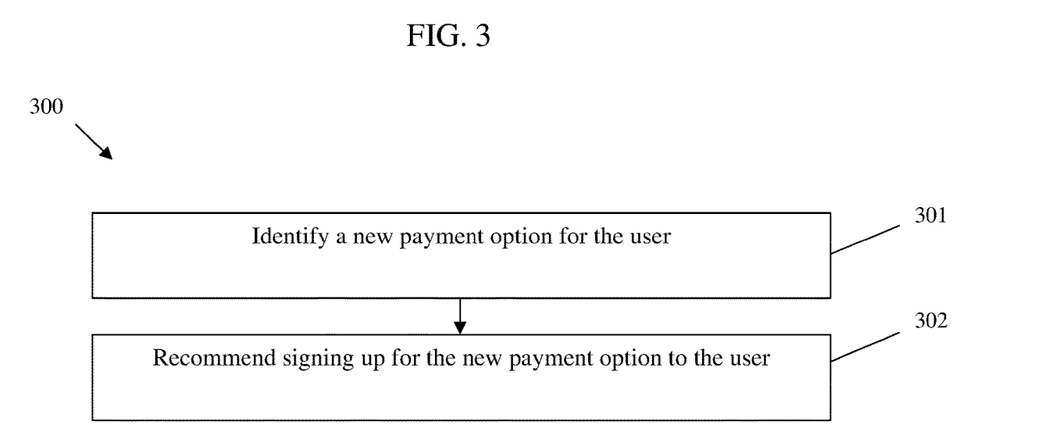
FIG. 3 is a flowchart of another method of recommending a payment option according to aspects of the present disclosure.

Referring particularly to FIG. 3, in method 300 a new payment option not included in the payment options for the user is identified 301. A recommendation to sign up for the new payment option is transmitted to the user 302. For example, a new credit card offering including 5% cash back on each purchase for the first 3 months may be identified. Alternatively, a consumer credit card specific to the particular prospective purchase may be identified having a higher cash back value. The new payment option may include an offering made available in real-time (e.g., an offer available for a limited period of time that is immediately available or will become available at a known point in time). Thus, new payment options including some form of rewards may be identified in real-time and transmitted to the user. The new payment option may be recommended, at least in part, based on the purchase activity/history for the user.

Figure 4:
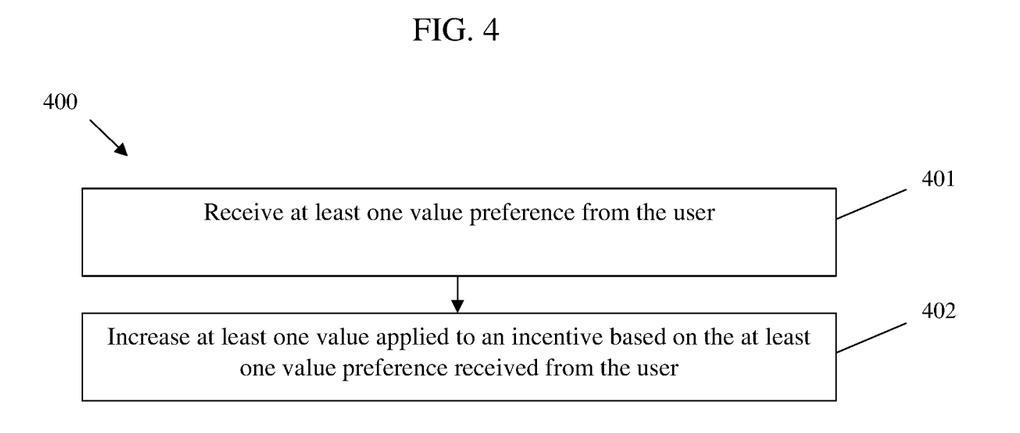
FIG. 4 is a flowchart of another method of recommending a payment option according to aspects of the present disclosure.

Referring particularly to FIG. 4, in method 400 at least one value preference is received from the user 401. The value applied by the classifier is increased based on the value preference received from the user 402. As an example, a user may select a preference for cash back to be more highly valued by weighting the cash back incentive an additional 1%. Thus, a first credit card offering 1% cash back (2% weighted) could be recommended over a second credit card offering 1.5% value in the form of travel points without any cash back or additional incentives. Reward/membership points may also be inherently weighted based on the policies associated with the payment option. For example, a credit card company may provide 1 membership point for every dollar spent on groceries, but 5 membership points for travel purchases. Thus, the inherent weight of reward/membership options can be considered in determining a value for an available incentive.

Figure 5:
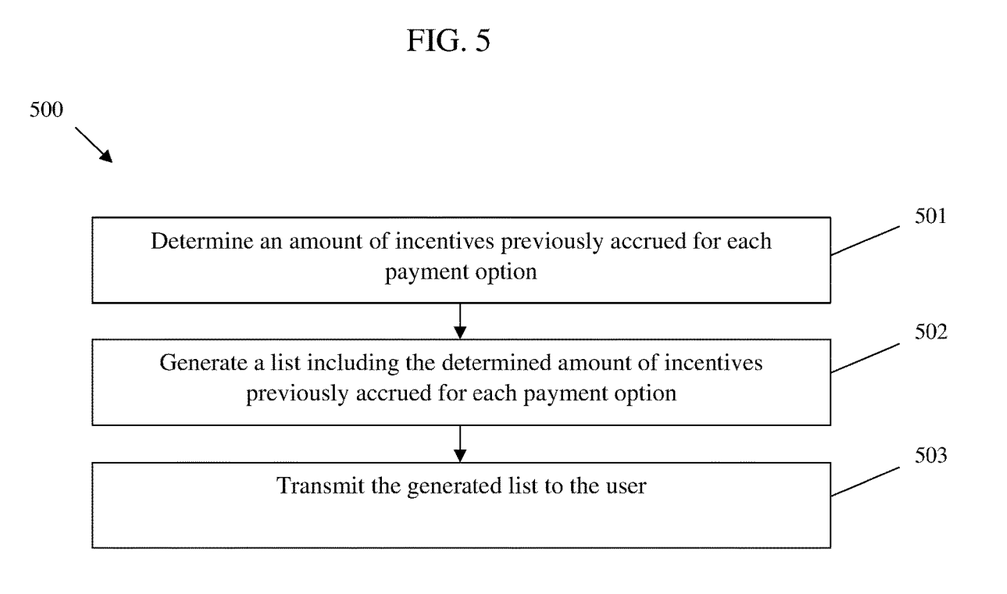
FIG. 5 is a flowchart of another method of recommending a payment option according to aspects of the present disclosure.

Referring particularly to 5, in method 500 an amount of incentives previously accrued for each payment option is determined 501. A list is generated including the incentives previously accrued for each payment option 502. The list is transmitted to the user 503. As an example, a user may have a desire to accrue travel points on a particular credit card with a minimal or zero travel points accrued, particularly if other credit cards held by the user have accumulated relatively high levels of travel points. In this instance, the user may choose to use a credit card with minimal or zero travel points over a credit card with a higher accumulated number of travel points (even if the reward point values are not equal).

Figure 6:
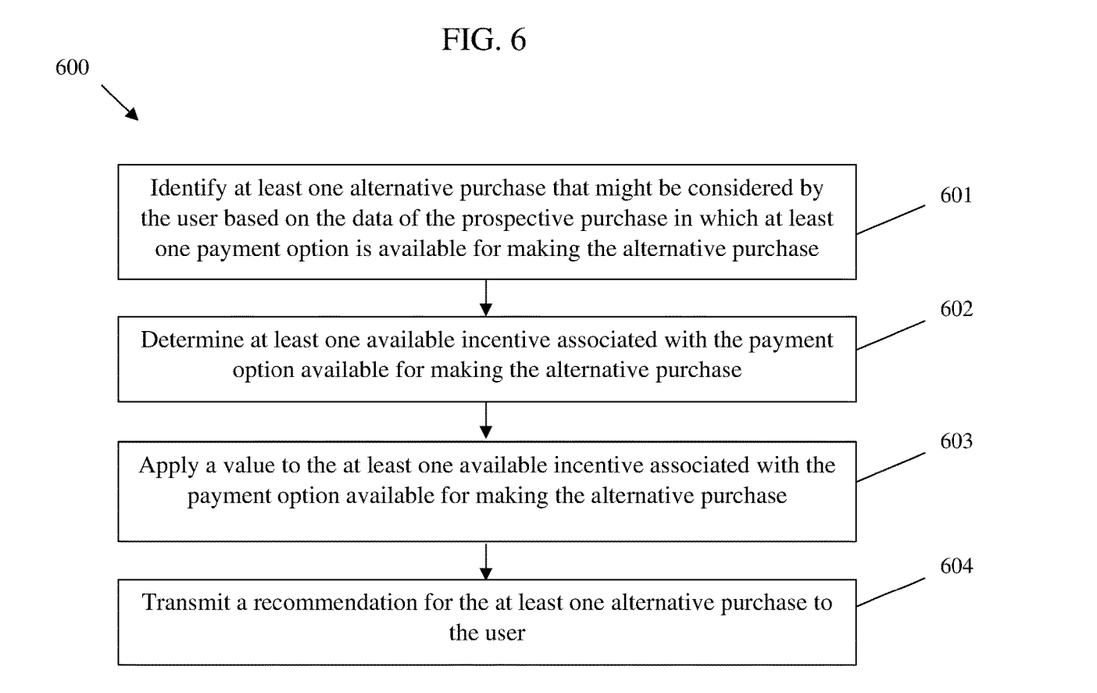
FIG. 6 is a flowchart of another method of recommending a payment option according to aspects of the present disclosure.
Figure 7:
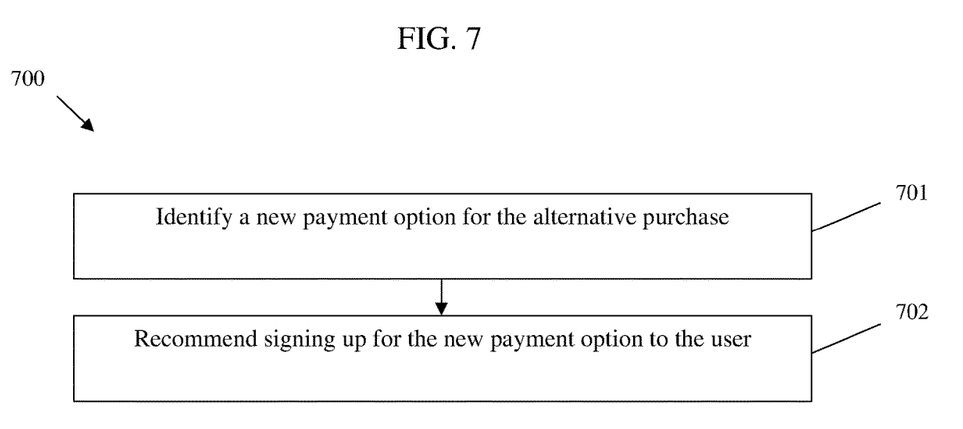
FIG. 7 is a flowchart of another method of recommending a payment option according to aspects of the present disclosure.

Referring particularly to FIGS. 6 and 7, in method 600 an alternative purchase that might be considered by the user is identified based on the data of the prospective purchase in which a payment option for the user is available for making the alternative purchase 601. The classifier determines an incentive associated with the payment option available for making the alternative purchase 602. The classifier applies a value to the available incentive associated with the payment option available for making the alternative purchase 603. A recommendation for the alternative purchase is transmitted to the user 604. The recommendation for the alternative purchase includes the value applied to the available incentive for the alternative purchase. As an example of a recommendation transmitted to a user, the recommendation may include a first suggestion to use a first payment option for making a purchase (e.g., to use a particular credit card to make a purchase based on the value of the associated incentive(s)), and a second suggestion to use a particular redemption platform (e.g., a particular travel web site) for redeeming the associated incentives to further maximize the value of the incentives. The second suggestion to use the particular redemption platform for redeeming the associated incentives may take into account maximizing the incentives received for using a particular payment option. A new payment option can be suggested for making the alternative purchase. The recommendation for an alternative purchase may also include a recommendation to purchase related products (e.g., a speaker or speaker system for a TV that has been suggested as an alternative purchase). The related products recommended for purchase would be recommended based on an analysis of how to maximize incentives in purchasing the related products based on the methods described herein.

In method 700, a new payment option for the alternative purchase is identified 701. A recommendation is sent to the user to sign up for the new payment option 702. The recommendation may include information about additional benefits included with the new payment option, such as a free or reduced-price warranty, or insurance (e.g., travel insurance), access to a private lounge (e.g., a travel lounge). The recommendation is stored and made accessible for later access by the user, thus allowing the user to access all warranties, insurance and other additional benefits, such as the non-monetary benefits described herein.

As an example, the new payment option includes at least one incentive that will become available on a future date. The alternative purchase option may be a purchase option that will become available on a future date. For example, it may be identified that a particular credit card is offering an increased incentive beginning the following week and/or that a particular product is scheduled to go on sale the next day or following week.

Figure 8:
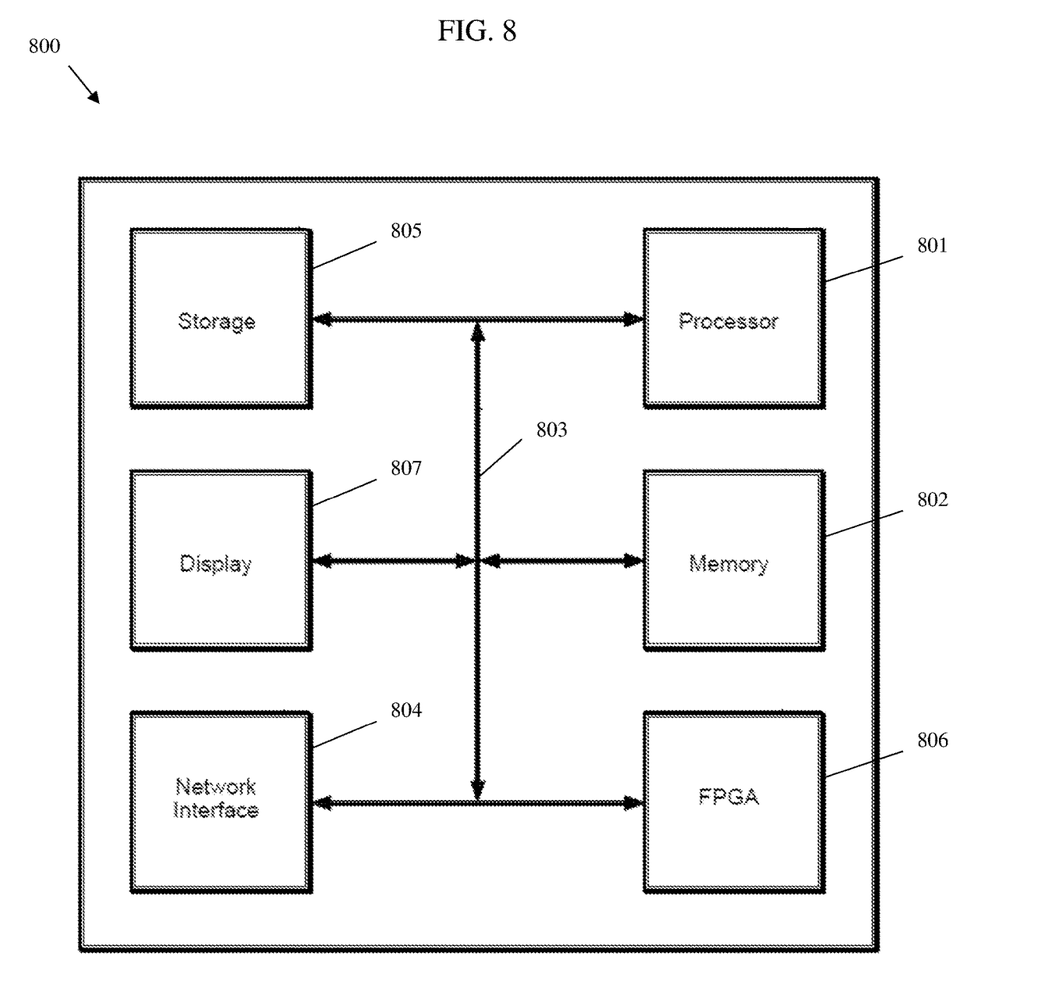
FIG. 8 is a block diagram of an exemplary computer for implementing the method of recommending a payment option according to aspects of the present disclosure.

Referring particularly to FIG. 8, a general purpose computer 800 is described. The general purpose computer 800 can be employed to perform the various methods and algorithms described herein. The computer 800 may include a processor 801 connected to a computer-readable storage medium or a memory 802 which may be a volatile type memory, e.g., RAM, or a non-volatile type memory, e.g., flash media, disk media, etc. The processor 801 may be another type of processor such as, without limitation, a digital signal processor, a microprocessor, an ASIC, a graphics processing unit (GPU), field-programmable gate array (FPGA), or a central processing unit (CPU).

In some aspects of the disclosure, the memory 802 can be random access memory, read-only memory, magnetic disk memory, solid state memory, optical disc memory, and/or another type of memory. The memory 802 can communicate with the processor 801 through communication buses 803 of a circuit board and/or through communication cables such as serial ATA cables or other types of cables. The memory 802 includes computer-readable instructions that are executable by the processor 801 to operate the computer 800 to execute the algorithms described herein. The computer 800 may include a network interface 804 to communicate (e.g., through a wired or wireless connection) with other computers or a server. A storage device 805 may be used for storing data. The computer 800 may include one or more FPGAs 806. The FPGA 806 may be used for executing various machine learning algorithms. A display 807 may be employed to display data processed by the computer.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A computer-implemented method of recommending a payment option, the method comprising:
   receiving data of a plurality of payment options for a user;
   receiving data of a prospective purchase to be made by the user, wherein at least two payment options of the plurality of payment options are available for making the prospective purchase;
   training a classifier on a tagged data set including previously generated payment option recommendations, wherein the classifier includes a convolutional neural network, a Bayesian network, a neural tree network, or a support-vector machine;
   determining, by the classifier, at least one available incentive associated with each of the at least two payment options of the plurality of payment options;
   applying, by the classifier, a value to the at least one available incentive associated with each of the at least two payment options of the plurality of payment options;
   comparing, by the classifier, the applied values for the at least one available incentive associated with each of the at least two payment options of the plurality of payment options;
   identifying a payment option having a corresponding incentive with the highest applied value;
   recommending the identified payment option to the user;
   identifying at least one alternative purchase that might be considered by the user based on the data of the prospective purchase, wherein at least one payment option of the plurality of payment options is available for making the at least one alternative purchase, wherein identifying at least one alternative purchase includes determining a geographic location of the user using location tracking of the user and identifying the at least one alternative purchase based on the geographic location of the user;
   determining, by the classifier, at least one available incentive associated with the at least one payment option available for making the at least one alternative purchase;
   applying, by the classifier, a value to the at least one available incentive associated with the at least one payment option available for making the at least one alternative purchase, wherein the value applied to the at least one available incentive associated with the at least one payment option available for making the at least one alternative purchase is calculated based on an incentive to be received by the user;
   determining that the value applied to the at least one available incentive associated with the at least one payment option available for making the at least one alternative purchase is higher than any of the applied values for the at least one available incentive associated with each of the at least two payment options of the plurality of payment options;
   transmitting a recommendation for the at least one alternative purchase to the user, wherein the recommendation for the at least one alternative purchase includes the value applied to the at least one available incentive associated with the at least one payment option available for making the at least one alternative purchase;
   receiving a signal that the user has made a purchase of the at least one alternative purchase; and
   re-training the classifier on a second tagged data set including data of the received signal that the user has made the purchase of the at least one alternative purchase; wherein the second tagged data set includes data of the value applied to the at least one available incentive associated with the at least one payment option available for making the at least one alternative purchase.

2. The method of claim 1, wherein the plurality of payment options are stored in a digital wallet, an electronic wallet, or a database.

3. The method of claim 1, wherein the incentives include cash back, rewards points, or non-monetary benefits.

4. The method of claim 3, wherein the non-monetary benefits include an additional warranty, theft protection, flight forgiveness, or insurance.

5. The method of claim 1, further including:
   generating a list including the value applied to the at least one available incentive associated with each of the at least two payment options of the plurality of payment options; and
   transmitting the generated list to the user.

6. The method of claim 1, wherein the plurality of payment options includes at least one credit card, at least one debit card, at least one prepaid card, at least one gift card, at least one bank card, at least one virtual card, at least one membership card, or at least one membership account.

7. The method of claim 1, wherein the plurality of payment options includes at least one cryptocurrency.

8. The method of claim 7, wherein the cryptocurrency is configured to be authenticated using a blockchain.

9. The method of claim 1, further including providing a list of payment options in order of priority based on at least one predetermined priority convention provided by the user.

10. The method of claim 1, further including:
    identifying a new payment option not included in the plurality of payment options for the user; and
    recommending signing up for the new payment option to the user.

11. The method of claim 10, wherein the new payment option includes at least one incentive that will become available on a future date.

12. The method of claim 1, further including
    receiving at least one value preference from the user; and
    increasing at least one value applied by the classifier based on the at least one value preference received from the user.

13. The method of claim 1, further including:
  determining an amount of incentives previously accrued for each payment option of the plurality of payment options;
  generating a list including the determined amount of incentives previously accrued for each payment option of the plurality of payment options; and
  transmitting the generated list to the user.

14. The method of claim 1, wherein the data of the prospective purchase to be made by the user is received from a digital shopping cart.

15. The method of claim 1, further including:
  identifying a new payment option for the at least one alternative purchase not included in the plurality of payment options for the user; and
  recommending signing up for the new payment option to the user.

16. The method of claim 1, wherein the geographic location of the user is determined by using the location tracking of a smartphone or tablet computer.

17. The method of claim 16, wherein the at least one available incentive associated with the at least one payment option available for making the at least one alternative purchase includes a non-monetary benefit.

18. The method of claim 17, wherein the non-monetary benefits include an additional warranty, theft protection, flight forgiveness, or insurance.

* * * * *